READ CONTROL METHOD AND APPARATUS FOR A CHARACTER READER

Filed Dec. 24, 1963 2 Sheets-Sheet 1

INVENTOR.
WILLIAM E. LUTZ
BY John V. Regan
ATTORNEY

INVENTOR.
WILLIAM E. LUTZ
BY John V. Regan
ATTORNEY 3,303,467
Patented Feb. 7, 1967

3,303,467

READ CONTROL METHOD AND APPARATUS FOR A CHARACTER READER

William E. Lutz, Glenside, Pa., assignor to Radio Corporation of America, a corporation of Delaware Filed Dec. 24, 1963, Ser. No. 333,109
2 Claims. (Cl. 340—146.3)

This invention relates to optical character readers for reading data printed on documents, and more particularly relates to methods and circuits for controlling the amount of data that is read by the character reader.

In certain optical character readers, documents are transported past a scanner so that the characters printed on the documents are electro-optically scanned in succession. The characters are recognized by the distinctive sets of video signals produced when different characters are scanned. The term "character" is utilized throughout the specification to denote alphabetic, numeric, and other symbols which are printed on a document by printing apparatus.

Printed documents in the form of invoices, notices, etc., are frequently utilized by public utility and other companies to bill customers periodically. Such documents, when in stock form, normally include form printed material such as the name and address of the company, instructions to the customer, etc. The term "printed material" is used throughout the specification to refer to this stock form printed matter. The various stock form documents utilized by the same or different companies vary appreciably in size, format, etc. On such documents the name, address, and other data for different customers are printed in characters readable by a character reader in blank spaces provided therefor. The term "printed characters" is used throughout the specification to refer to characters that are readable by a character reader. Thus, the printed data on a document includes both printed characters and printed material. The printed characters may be printed on only a small portion of a document and may be surrounded by printed material. Character readers usually and desirably are not capable of reading printed material and if attempts are made to do so, adverse effects may result. For example, when reading turn-around documents, i.e., documents printed by a computer-operated printer and subsequently returned to be read by a character reader to provide an input to the computer, the computer may require all or most characters to be recognizable or else the document is rejected as unreadable. Such turn-around documents would be rejected as unreadable even though the printed characters are completely recognizable if the printed material is also read. Thus, it is important that a character reader read only the printed characters on a document. The character reader is thereby rendered capable of reading documents of various sizes, formats, etc., which greatly enhances the flexibility and usefulness of the reader.

Accordingly, it is an object of this invention to provide a character reader capable of reading documents of various sizes and formats.

Another object of the invention is to provide an improved method of reading printed characters carried by a document which includes other printed material.

Another object of this invention is to provide a character reader which limits the amount of printed data that is read from a document.

It is another object of this invention to provide a read control circuit for a character reader which controls the amount of printed data that is read from a document.

A character reader embodying the invention includes a read control circuit which controls the amount of printed data that is read from printed documents. The printed data on the documents to be read include printed characters beginning and ending at positions spaced from a leading edge of the documents. The documents are transported edgewise and one-by-one past a reading station at a substantially constant velocity. The read control circuit is preset to generate a read signal at a predetermined time after the leading edge of a document arrives at the reading station. The predetermined time is selected to coincide with the time it takes for a document to move a distance substantially equal to the distance between the leading edge of the document and the beginning of the printed characters thereon. The reading station is activated by the read signal to read the printed characters as they move past the station. The read control circuit generates a read signal which is preset to exhibit a time duration that coincides with the time it takes for a document to move a distance substantially equal to the distance between the beginning and end of the printed characters desired to be read on the document. At the termination of the read signal, the reading station is deactivated. Thus, only the desired printed characters on a document are read by the character reader and other printed material is ignored.

Figure 1:
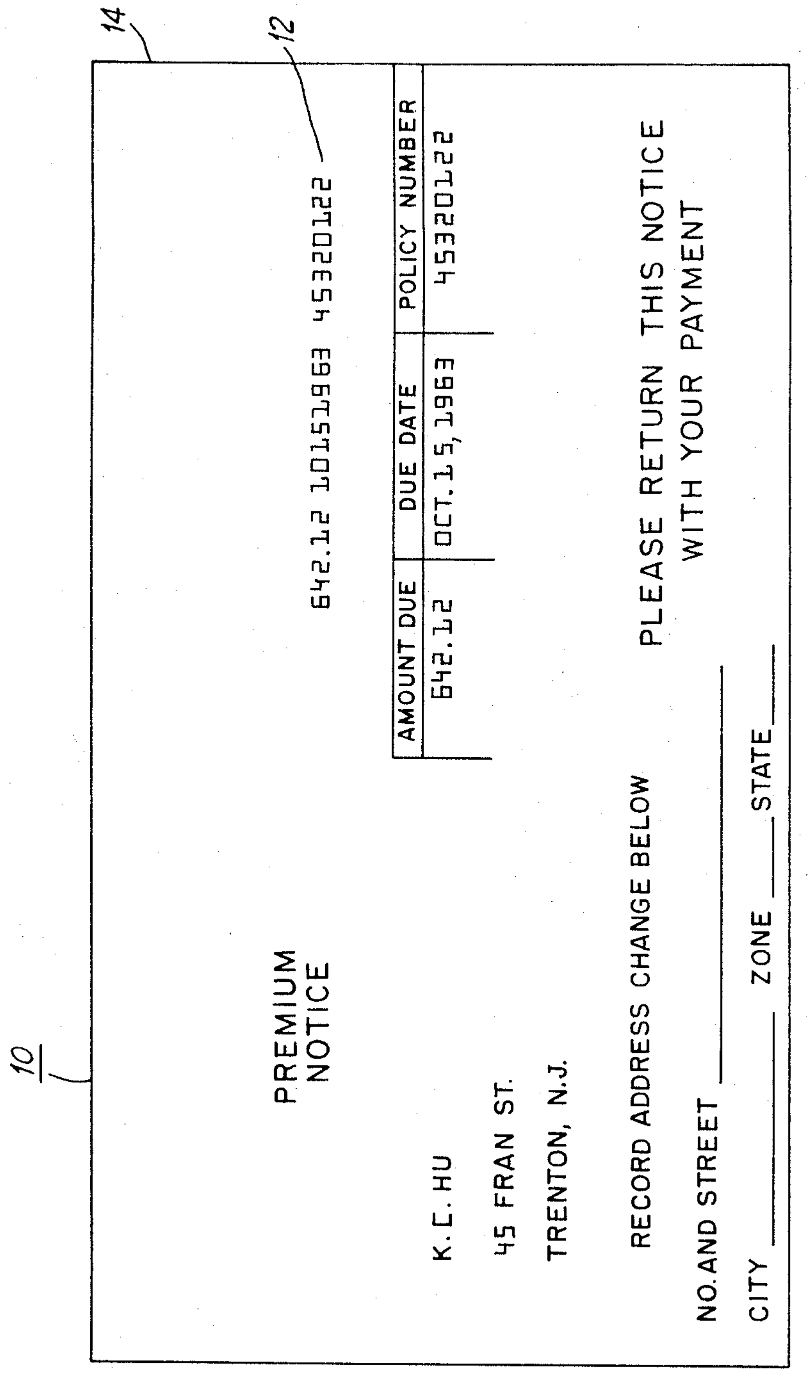
FIGURE 1 is an enlarged illustration of a printed document that is helpful in understanding the invention.

Referring now to FIGURE 1, there is shown, for illustrative purposes only, one type of document 10 which includes both printed characters to be read by a character reader and printed material to be ignored. The document 10 is shown as a premium notice which is mailed by an insurer to an insured to notify him of a premium payment that is due. The stock form of the document 10 may include such printed material as the name and address of the insurer (not shown), the title of the document, i.e., Premium Notice, as well as instructions to the insured to return the notice with the payment, etc. The printed characters on the document 10 include the name and address of the insured as well as the policy number, premium amount and date due, all of which may vary from document to document. The printed characters appearing on line 12 of the document 10 are a repetition of selected data and comprise the data to be read by the character reader. This selected data includes the policy number which identifies the insured, as well as the due date of the premium payment and the amount due. Thus, only a relatively small amount of the printed data on the document 10 is to be read by a character reader. It is to be noted that the printed characters on line 12 begin at a first position spaced from the right edge of the document 10 and end at a second position spaced therefrom. Overlapping the line 12 on the document 10 is the printed material, i.e., the title, normally included on a stock form document. If a character reader reads this printed material, it would be unable to recognize the data read due to the great difference in type size as compared with the printed characters. Consequently, an inordinate amount of unrecognizable data would be fed to a processing computer and the whole document would be rejected as unreadable. A series of such rejections would render the whole operation useless. Accordingly, a read control circuit is embodied in the character reader to control the character reader so as to read only the printed characters appearing on line 12 of the document 10.

Figure 2:
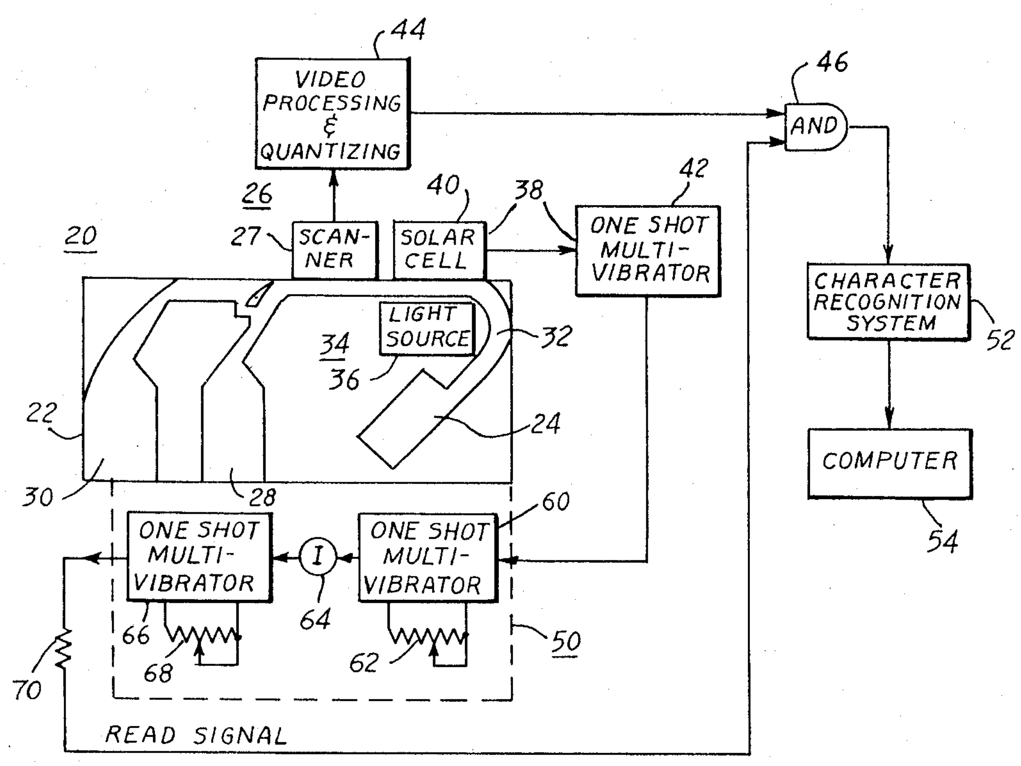
FIGURE 2 is a schematic block diagram of a character reading system embodying a read control circuit in accordance with the invention; and, FIGURE 3 is another embodiment of a read control circuit.

Referring now to FIGURE 2, a schematic block diagram of a character reading system 20 that embodies the invention is shown. The character reading system 20 comprises an RCA Model 5820 optical character reader. The character reading system 20 includes a document transport 22 which is shown in plan view and in an outline schematic form. The document transport 22 includes an input hopper 24 from which documents are transported past a reading station 26 to one or the other of a pair of output stackers 28 and 30. The stacker 28 may, for example, comprise an accept stacker while the stacker 30 comprises a re-run stacker.

The printed documents to be read are stacked edgewise in the input hopper 24. The documents are extracted one-by-one and transported along a feed track 32 at a substantially constant velocity of, for example, 150 inches per second by a feed mechanism (not shown). The documents are transported past a document leading edge detecting circuit 34 which includes a light source 36 mounted on one side of the feed track 32 and a document sensor 38 mounted on the other side of the feed track 32. The document sensor 38 includes a solar cell 40 serially connected to a one-shot or monostable multivibrator 42. When the leading edge of a document interrupts the transmission of light from the light source 36 to the solar cell 40, a decreasing step in the output current of the solar cell is produced. The decreasing step causes the one-shot multivibrator 42 to generate a pulse or reference signal denoting that the leading edge of a document has been detected. The detecting circuit 34 is positioned adjacent the reading station 26 so that the time elapsed in the generation of the pulse output thereof coincides with the arrival of the leading edge of a document at the reading station 26. It is to be noted that the leading edge of a document comprises substantially the only reference point for the moving documents 10.

The documents 10 are transported past the reading station 26 to be read thereby. The reading station 26 includes a scanner 27 mounted along the feed track 32 on the document transport 22 and positioned to scan the characters printed on the line 12 of the document 10 in FIGURE 1. The scanner 27, may, for example, comprise a photoconductive tube system such as a vidicon tube system. The scanning beam of the scanner 27 is deflected repeatedly and vertically to scan the characters from top to bottom. Such a single line electronic scanning along with the horizontal motion of the documents 10 past the scanner 27 effectively produces an orthogonal scanning raster. Each successive character is, therefore, scanned by a plurality of scan lines. The scanner 27 generates an output each time the outline trace of a character is intercepted by the scanning beam thereof. The video signals generated by the scanner 27 include signals denoting the features of a character, i.e., the various horizontal and vertical stroke features, etc. The features of any character differ from the features of any other character, and stylized fonts may be utilized to emphasize these differences.

The video signals generated by a scanner 27 are applied to a video processing and quantizing circuit 44 in the reading station 26. The processing circuit 44 processes the raw video signals to derive quantized video signal pulses having a uniform amplitude and exhibiting fast rise and fall times.

The quantized video signals are applied as one input to an AND gate 46. The other input to the AND gate 46 comprises a read signal derived from a read control circuit 50 to be described subsequently. Quantized video signals gated through the AND gate 46 are applied to a character recognition system 52. The character recognition system 52 extracts and synthesizes the various feature signals contained in the video signals to produce an output signal in binary coded form which represents the character read. The binary coded output signals from the character recognition system 52 are applied to an output circuit which may, for example, comprise a computer 54.

Also included in the character reading system 20 is a read control circuit 50. The read control circuit 50 includes a monostable or one-shot multivibrator 60 having as the input thereto the reference signal pulse derived from the detecting circuit 34. The multivibrator 60 exhibits an astable state of operation to which it is triggered by the reference pulse, which reference pulse denotes the leading edge of a document. The multivibrator 60 remains in its astable state of operation for a predetermined time producing an output pulse of a predetermined duration. At the end of the predetermined time, the multivibrator 60 switches back to its stable state of operation. The time duration of the output pulse is dependent upon the R-C time constant of the feedback path between the active elements in the circuit. The time constant and hence the duration of the output pulse is controlled by a potentiometer 62 which may, for example, be mounted on the control panel (not shown) of the document transport 22 while the remainder of the multivibrator 60 is located remotely therefrom. The adjustment of the potentiometer 62 linearly varies the time constant and hence the duration of the output pulse of the multivibrator 60 in accordance with the equation, $$T=KRC \tag{1}$$

wherein,

T is the time duration of the output pulse
K is a constant depending on the circuit parameters of the multivibrator
R is the resistance of the potentiometer 62
C is the capacitance of the feedback path For the multivibrator 60, K is equal to 0.693 and C is equal to 2 microfarads.

The output signal of the multivibrator 60 is applied to an inverter 64. The inverted output signal of the inverter 64 is applied to another one-shot multivibrator 66 which may be identical to the multivibrator 60. A control potentiometer 68 is also included with the multivibrator 66 which is identical to the potentiometer 62. A resistor 70 is connected in series with the potentiometer 68. The multivibrator 66 operates in a manner similar to the multivibrator 60. The signal output of the multivibrator 66 comprises a read signal which provides the other input to the output AND gate 46 of the reading station 26. The resistor 70 is included in the R-C feedback path of the multivibrator 66 to elongate the read signal output of this multivibrator to insure that all printed characters are read. Thus, the reading station 26 produces an output during the presence of a read signal from the read control circuit 50.

In operation, it will be assumed that a document such as that shown in FIGURE 1 is to be read by the character reading system 20. Such a document is mailed to an insured by the insurance company and is returned to the company with the premium payment. The sole amount of information to be read from the document 10 comprises the characters printed on the line 12 of this document. When reading a stack of such documents, an operator first measures the distance from the leading edge 14 of the document 10 to the first of the printed characters on line 12 to be read and then measures the length of all the printed characters. It is assumed that these distances are 0.5 and 2 inches, respectively. These distances are the same for all the documents in the stack.

Each of the printed characters including their surrounding margin is 0.1 inch wide. However, it is to be recalled that for convenience, the document 10 and the printed characters on line 12 are shown enlarged. The potentiometer 62 is set to cause a pulse to be generated by the multivibrator 60 which has a duration that coincides with the time it takes for the document 10 to be transported the 0.5 inch. Similarly, the potentiometer 68 is set to cause the multivibrator 66 to generate a pulse which has a duration equivalent to a movement of the document of 2 inches. Since the documents 10 are transported at the substantially constant velocity of 150 inches per second, the time it takes a document to move 1 inch or 10 printed characters is 6⅔ milliseconds. The potentiometers 62 and 68 are variable up to 50,000 ohms and calibrated in tenths and hundredths. As shown by Equation 1, a resistance of 50,000 ohms produces a pulse output width of approximately 69.3 milliseconds which is substantially equivalent to 10 inches of document movement or 100 characters. Thus, each tenth of the potentiometer scale is equivalent to 1 inch or 10 characters while each hundredth is equivalent to 0.1 inch or 1 character. Thus, the measured distances of 0.5 inch and 2 inches are readily and directly transposed into time by the potentiometers 62 and 68.

The stack of documents 10 are inserted edgewise into the input hopper 24 to be read by the character reading system 20. The documents are fed edgewise and one-by-one from the input hopper 24 to the feed track 32. The leading edge 14 of a document interrupts the transmission of light from the light source 36 to the document sensor 38 to produce a reference signal output therefrom. The reference signal is coupled to trigger the multivibrator 60 to its astable operating state. The multivibrator 60 is preset to produce an output pulse of substantially 3⅓ milliseconds to correspond to the time it takes for the document to move 0.5 inch. The high level output signal from the multivibrator 60 is inverted in the inverter 64 to a low level signal. The trailing edge of this signal triggers the multivibrator 66 to its astable operating state. Thus, the multivibrator 62 and inverter 64 effectively function to delay the leading edge reference signal a predetermined time. The multivibrator 66 is preset to generate a read signal of substantially 13⅓ milliseconds (6⅔×2) to correspond to the 2 inches of printed characters on line 12 of the document 10. The read signal activates the AND gate 46 to couple the video signals derived by the reading station 26 scanning the printed characters to the character recognition system 52. Each character is recognized successively by the character recognition system 52 producing an input to the computer 54.

At the termination of the read signal produced by multivibrator 66, the AND gate 46 is blocked and no video signals derived from scanning printed material are transmitted to the character recognition system 52. Thus, the printed material on the document 10 may be scanned by the scanner 27 but no adverse effects are created in the character recognition system 52.

Figure 3:
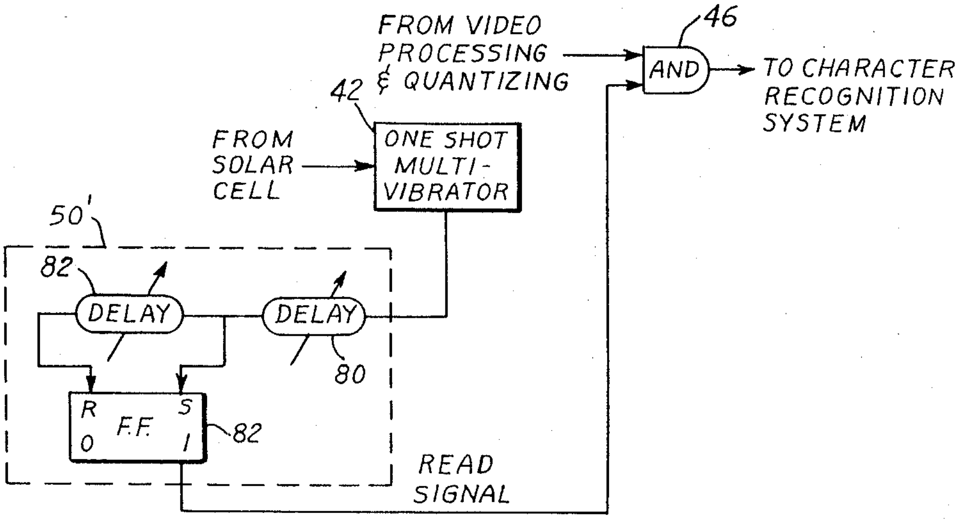

Referring now to FIGURE 3, there is illustrated a modified version of a read control circuit 50' for the charatcer reading system 20. In this embodiment, the read control circuit 50' is modified to include a variable delay line 80 coupled to receive and introduce a preset delay into the reference signal derived from the multivibrator 42 in the document leading edge detecting circuit 34. The output of the delay circuit 80 is coupled to the set terminal (S) of a flip-flop 82 which generates a read signal when set. The read signal is generated when the printed characters arrive at the reading station 26. The "1" output terminal of the flip-flop 82 is coupled to activate the AND gate 46 coupling the reading station 26 to the character recognition system. The output of the delay circuit 80 is also coupled through a second delay circuit 82 to the reset terminal (R) of the flip-flop 82. The delay introduced by the delay circuit 82 determines the length of the read signal and is preset to reset the flip-flop 82 after the printed characters have passed the reading station 26.

Thus, in accordance with the invention, a character reader is provided with a read control circuit which permits the character reader to read a wide variety of documents. The documents read may be of various sizes and formats with the printed characters beginning and ending at various random positions on the documents. The read control circuit increases the flexibility of character readers and makes them more useful.

What is claimed is:

1. The method of reading printed characters from a document containing both printed characters and other printed material with a character reader having an optical reading station and a document transport for transporting documents past said reading station at a substantially constant velocity, comprising the steps of,
   - manually measuring the distance from the leading edge of a document to the first one of said printed characters to derive a first distance,
   - manually measuring the distance from the first one of said printed characters to the last one of said printed characters to derive a reading distance that excludes said printed material,
   - transporting documents one-by-one past said reading station,
   - detecting the leading edge of a document to generate a reference signal,
   - optically scanning said document from the beginning to the end thereof to derive character signals when said printed characters are scanned and undesired signals when said printed material is scanned,
   - delaying said reference signal for a time that is manually preset to substantially coincide with the time it takes for said document to move a distance equal to said first distance at said velocity,
   - utilizing said delayed reference signal to generate a read signal having a duration that is manually preset to coincide substantially with the time it takes for said document to move a distance equal to said reading distance at said velocity, and
   - applying said read signal to gate open said reading station to pass only said character signals and block said undesired signals.

2. In a character reader for reading printed characters from a document containing both printed characters and other material, said printed characters beginning at a first distance from the leading edge of said document and ending at a second distance spaced from the first character of said printed characters, said character reader including an optical reading station and a transport mechanism for transporting said documents past said reading station at a substantially constant velocity, the combination comprising,
   - means for generating a reference signal when the leading edge of a document is detected,
   - adjustable delay means for delaying said reference signal for a predetermined time,
   - said predetermined time being preset in said adjustable delay means to delay said reference signal for the time it takes for a document to move a distance substantially equal to said first distance at said velocity,
   - scanning means coupled to optically scan documents from beginning-to-end to derive scan signals including character signals when said printed characters are scanned and undesired signals when said printed material is scanned,
   - adjustable generating means coupled to said adjustable delay means to be activated by said delayed reference signal to generate a read signal,
   - said adjustable generating means being preset to generate a read signal having a duration that substantially coincides with the time it takes for said document to move a distance substantially equal to said second distance at said velocity, gating means coupled to receive said scan signals, and means for applying said read signal to gate open said gating means so as to pass only said character signals and block said undesired signals.

References Cited by the Examiner

FOREIGN PATENTS 644,991 7/1962 Canada.
910,808 11/1962 Great Britain.

References Cited by the Applicant

UNITED STATES PATENTS 3,092,809 6/1963 Merritt et al.

FOREIGN PATENTS 605,929 9/1960 Canada.

MAYNARD R. WILBUR, *Primary Examiner.*

DARYL W. COOK, *Examiner.*

J. E. SMITH, *Assistant Examiner.*